United States Patent
Nagano et al.

(10) Patent No.: US 9,803,533 B2
(45) Date of Patent: Oct. 31, 2017

(54) TRACTOR WITH EXHAUST GAS TREATMENT UNIT

(71) Applicant: ISEKI & CO., LTD., Matsuyama-shi (JP)

(72) Inventors: Ryota Nagano, Ehime-ken (JP); Shinya Yoshiki, Ehime-Ken (JP); Tatsuzo Murakami, Ehime-Ken (JP); Yoshitaka Takechi, Ehime-Ken (JP); Erina Tamura, Ehime-Ken (JP)

(73) Assignee: ISEKI & CO., LTD., Matsuyama-shi (JP)

( * ) Notice: Subject to any disclaimer, the term of this patent is extended or adjusted under 35 U.S.C. 154(b) by 0 days.

(21) Appl. No.: 15/099,003

(22) Filed: Apr. 14, 2016

(65) Prior Publication Data

US 2016/0305305 A1    Oct. 20, 2016

(30) Foreign Application Priority Data

Apr. 20, 2015    (JP) .................................. 2015-086255

(51) Int. Cl.
*F01N 13/14*    (2010.01)
*B62D 49/00*    (2006.01)
(Continued)

(52) U.S. Cl.
CPC .............. *F01N 13/14* (2013.01); *B60K 13/04* (2013.01); *B62D 49/00* (2013.01); *F01N 3/2066* (2013.01);
(Continued)

(58) Field of Classification Search
CPC ............. F01N 2610/02; F01N 2260/02; F01N 2570/14; F01N 2510/02; F01N 3/28;
(Continued)

(56) References Cited

U.S. PATENT DOCUMENTS 7,937,936 B2    5/2011    Recker et al.
9,309,800 B2 *  4/2016    Adupala ................. F01N 13/08
(Continued)

FOREIGN PATENT DOCUMENTS

JP    5102180    12/2012
JP    5478689    4/2014
(Continued)

OTHER PUBLICATIONS

Extended European Search Report dated Aug. 17, 2016 in Patent Application No. 16162817.7.
(Continued)

*Primary Examiner* — John Walters
*Assistant Examiner* — James Triggs
(74) *Attorney, Agent, or Firm* — Oblon, McClelland, Maier & Neustadt, L.L.P.

(57) ABSTRACT

A tractor according to an embodiment of the present invention includes a front wheel, a rear wheel, a hood that covers an engine, and an exhaust gas treatment unit. The exhaust gas treatment unit is placed laterally outside right or left side of the hood and behind the front wheel, and purifies exhaust gas from the engine. A circular cylindrical heat shielding plate covers an outer circumferential surface of the exhaust gas treatment unit. A plurality of vent holes are formed in a rear surface of the heat shielding plate, and are not formed in a region that lies on a front surface of the heat shielding plate and faces the front wheel.

3 Claims, 9 Drawing Sheets

(51) Int. Cl.
*B60K 13/04* (2006.01)
*F01N 3/20* (2006.01)
*F01N 13/00* (2010.01)

(52) U.S. Cl.
CPC .......... *F01N 13/00* (2013.01); *F01N 2260/20* (2013.01); *F01N 2590/08* (2013.01); *F01N 2610/02* (2013.01); *F01N 2610/1406* (2013.01); *F01N 2610/1433* (2013.01); *Y02T 10/24* (2013.01)

(58) Field of Classification Search
CPC ......... F01N 13/14; F01N 13/08; B62D 49/00; B60K 13/04
See application file for complete search history.

(56) References Cited

U.S. PATENT DOCUMENTS

| | | | |
|---|---|---|---|
| 2011/0283687 A1* | 11/2011 | Dobler | F01N 13/1805 60/299 |
| 2012/0036843 A1 | 2/2012 | Schertz et al. | |
| 2012/0144809 A1 | 6/2012 | Ducroquet | |
| 2014/0124283 A1 | 5/2014 | Novacek et al. | |
| 2014/0331658 A1 | 11/2014 | Adupala et al. | |

FOREIGN PATENT DOCUMENTS

| | | |
|---|---|---|
| JP | 5523529 | 6/2014 |
| WO | WO 2010/069806 A1 | 6/2010 |

OTHER PUBLICATIONS

Office Action dated Dec. 9, 2016 in Australian Patent Application No. 2016202417.

\* cited by examiner

REAR ←→ FRONT

TRACTOR WITH EXHAUST GAS TREATMENT UNIT

CROSS-REFERENCE TO RELATED APPLICATIONS

The present application claims priority to and incorporates by reference the entire contents of Japanese Patent Application No. 2015-086255 filed in Japan on Apr. 20, 2015.

BACKGROUND OF THE INVENTION

1. Field of the Invention

The embodiment discussed herein is directed to a tractor.

2. Description of the Related Art

Conventionally, work vehicles, such as agricultural tractors, include each an exhaust gas treatment mechanism for purifying exhaust gas from an engine by sequentially passing the exhaust gas through two exhaust gas treatment units. For example, one of the two exhaust gas treatment units is placed inside a hood, and the other is placed outside the right or left side of the hood (refer to U.S. Pat. No. 7,937,936, for example).

In some cases, a cover covers an external surface of the exhaust gas treatment unit placed outside the hood.

In such a conventional work vehicle as described above, the exhaust gas treatment unit placed outside the hood is covered by the cover, so that heat of the exhaust gas treatment unit is accumulated inside the cover without being diffused, resulting in deterioration of the heat-releasing performance.

SUMMARY OF THE INVENTION

It is an object of the present invention to at least partially solve the problems in the conventional technology.

A tractor according to an aspect of an embodiment of the present invention includes a front wheel, a rear wheel, a hood that covers an engine, and an exhaust gas treatment unit. The exhaust gas treatment unit is placed laterally outside right or left side of the hood and behind the front wheel, and purifies exhaust gas from the engine. A circular cylindrical heat shielding plate covers an outer circumferential surface of the exhaust gas treatment unit. A plurality of vent holes are formed in a rear surface of the heat shielding plate, and are not formed in a region that lies on a front surface of the heat shielding plate and faces the front wheel.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

A more complete appreciation of the present embodiment and advantages associated therewith will be easily understood by reading the following detailed description of the embodiment with reference to the accompanying drawings.

DETAILED DESCRIPTION OF THE PREFERRED EMBODIMENTS

The following describes details of an embodiment of a tractor according to the present invention, based on the accompanying drawings. The embodiment is not intended to limit the present invention. Components in the following embodiment include those easily replaceable by people skilled in the art or those substantially the same.

Figure 1:
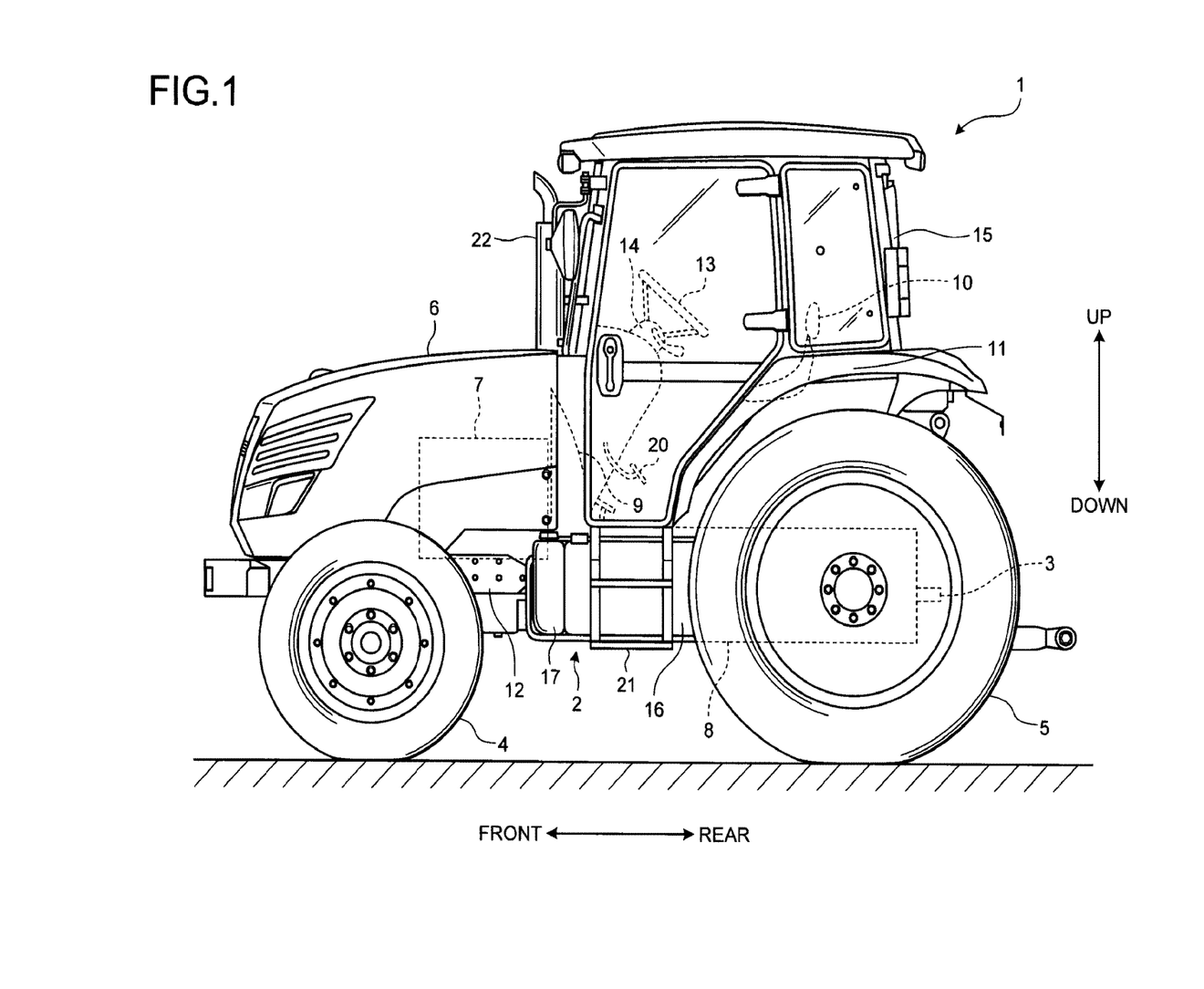
FIG. 1 is a schematic left side view of a tractor according to an embodiment of the present invention.

FIG. 1 is a schematic left side view of this tractor 1 according to the embodiment of the present invention. As illustrated in FIG. 1, the tractor 1 according to the embodiment is an agricultural tractor that performs ground work while traveling in a self-propelled manner in a farm field or the like. In the following description, a direction of forward travel of the tractor 1 is referred to as a front side (left side in FIG. 1); a direction opposite to the forward travel direction is referred to as a rear side (right side in FIG. 1); an orthogonal direction intersecting the front-rear direction of the tractor 1 at a right angle is referred to as a right-left direction; and the vertical direction intersecting the front-rear direction of the tractor 1 at a right angle is referred to as an up-down direction.

The tractor 1 can transmit motive power that is generated by an engine 7 and reduced in speed by a main transmission and a sub-transmission to front wheels 4. In the tractor 1, the motive power transmitted from the engine 7 drives four wheels consisting of the front wheels 4 and rear wheels 5 when a front-wheel accelerating switching mechanism transmits the motive power. In the tractor 1, the motive power transmitted from the engine 7 drives the two rear wheels 5 when the front-wheel accelerating switching mechanism cuts off the transmission of the motive power. In other words, the tractor 1 can perform switching between a two-wheel-drive mode and a four-wheel-drive mode. A rear part of a body 2 of the tractor 1 is provided with a power-take-off (PTO) output shaft 3 to which a work machine such as a rotary tiller can be attached.

The body 2 in constituted by, for example, a transmission case 8 accommodating, for example, the main transmission, the sub-transmission, the front-wheel accelerating switching mechanism, and a PTO transmission unit for transmitting a driving force to the PTO output shaft 3, a dash panel 9 mounted in front of the transmission case 8, and a body frame 12 that supports a cabin 15 and on which, for example, the engine 7 is mounted. The transmission case 8, the dash panel 9, and the body frame 12 constituting the body 2 are each made of metal. The body frame 12 is broadly divided into a part supporting the cabin 15 and a part on which, for example, the engine 7 is mounted under a hood 6.

The engine 7 is mounted on the body frame 12 on the front side of the dash panel 9, and covered by the hood 6. The transmission case 8 is provided across from the dash panel 9 to the rear part of the body 2. A driver's seat 10 is provided above a rear part of the transmission case 8. Fenders 11 for mudguard purposes are provided on the right and left sides of the driver's seat 10. The hood 6 is rotatably mounted on the body 2 so as to be capable of opening and closing the internal space thereof.

The driver's seat 10 is provided for an operator to sit on when driving the tractor 1, and is surrounded by the cabin 15 supported by the body frame 12. A steering wheel 13 used for steering the front wheels 4, a display panel for providing a variety of information to the operator, and an operation panel used by the operator to perform various operations are provided in front of the driver's seat 10. The steering wheel 13 is rotatably supported by a steering post 14. A clutch pedal 20, a brake pedal, and an accelerator pedal are provided below the steering post 14, that is, near the feet of the operator sitting on the driver's seat 10. The brake pedal is used for braking the rear wheels 5 according to an operation of the pedal, and the accelerator pedal is used for accelerating the body 2 according to an operation of the pedal.

A work machine up-down lever is provided on the right side of the driver's seat 10, and is used for up and down operations of the work machine, such as the rotary tiller, attached to the rear part of the tractor 1. A main shift lever and a sub-shift lever are provided on the left side of the driver's seat 10. While the tractor 1 is traveling, the main shift lever is used for performing operations of shifting the main transmission, and the sub-shift lever is used for performing operations for the sub-transmission. The main shift lever is used for main shifting operations serving to shift the main transmission, and can be switched between an automatic shift mode for automatically performing the main shifting and a manual shift mode for performing the main shifting at the will of the operator. In the manual shift mode, the main shift lever is used to switch the reduction ratio of the main transmission to that of any of eight shift speeds. The sub-shift lever is used to control the sub-transmission, and can be switched to traveling speed positions of an ultra-low speed, a low speed, a medium speed, and a high speed, and to a neutral position.

A fuel tank 16 for storing therein fuel to be supplied to the engine 7 is provided below the cabin 15. A urea water tank 17 is provided below the cabin 15, and stores therein urea water to be supplied to a second exhaust gas treatment unit 32 constituting an exhaust gas treatment mechanism 30 (refer to FIG. 2), which will be described later. The arrangement of the fuel tank 16 and the urea water tank 17 will be described later using FIG. 7.

A boarding step unit 21 is provided outside at least either of the right and left sides of the cabin 15 (outside of each of the right and left sides of the cabin 15, in the present embodiment) of the body 2, and is used by the operator to board into and unboard from the cabin 15. A muffler 22 for discharging purified exhaust gas from the engine 7 to the atmosphere is provided upright outside at least either of the right and left sides of the hood 6 on the body 2.

Figure 2:
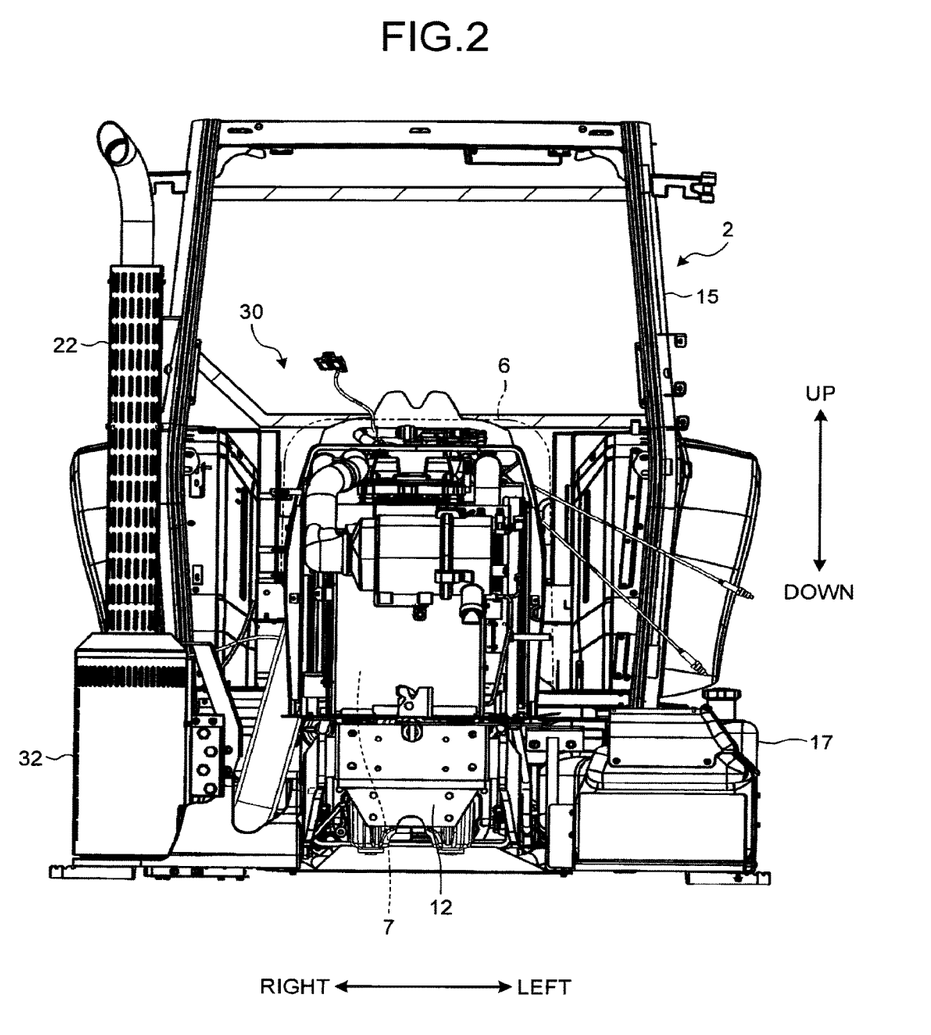
FIG. 2 is a front view illustrating a structure inside a hood.
Figure 3:
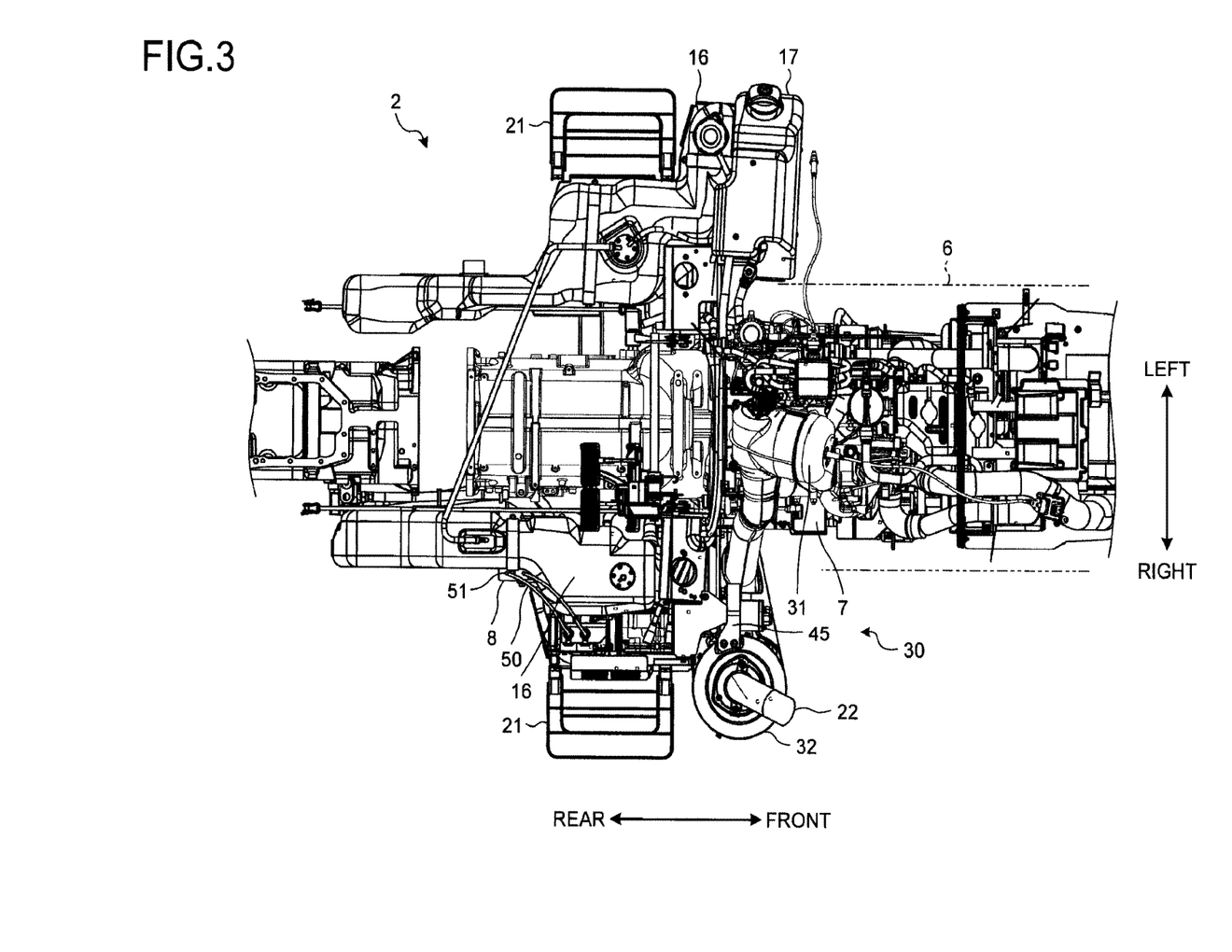
FIG. 3 is a plan view illustrating the structure inside the hood.

FIG. 2 is a front view illustrating a structure inside the hood 6. FIG. 3 is a plan view illustrating the structure inside the hood 6. FIG. 3 does not illustrate the cabin 15, for convenience of explanation. As illustrated in FIGS. 2 and 3, the exhaust gas treatment mechanism 30 for purifying the exhaust gas from the engine 7 to remove air pollutants is provided across from the inside to the outside of the hood 6. The exhaust gas treatment mechanism 30 includes two exhaust gas treatment units, that is, a first exhaust gas treatment unit 31 (refer to FIG. 3) and the second exhaust gas treatment unit 32. The first exhaust gas treatment unit 31 is placed above the engine 7 inside the hood 6. The second exhaust gas treatment unit 32 is placed outside the right or left side of the hood 6.

The first exhaust gas treatment unit 31 of the exhaust gas treatment mechanism 30 has a function of a diesel oxidation catalyst (DOC) for efficiently oxidizing nitrogen monoxide (NO) in the exhaust gas. The second exhaust gas treatment unit 32 of the exhaust gas treatment mechanism 30 has a function of selective catalytic reduction (SCR) using urea water ($NH_3$). The exhaust gas treatment mechanism 30 configured as described above converts the nitrogen monoxide (NO) contained in the exhaust gas into nitrogen dioxide ($NO_2$) in the DOC, and converts the nitrogen dioxide ($NO_2$) into water ($H_2O$) and nitrogen gas ($N_2$) by supplying urea water ($NH_3$) to the nitrogen dioxide ($NO_2$) in the SCR so as to remove nitrogen oxides ($NO_x$) in the exhaust gas. In general, both the DOC and the SCR are necessary to remove a specified amount of the nitrogen oxides ($NO_x$).

As illustrated in FIG. 3, the second exhaust gas treatment unit 32 and the muffler 22 provided so as to project from the top of the second exhaust gas treatment unit 32 are placed outside the right side of the hood 6. The urea water tank 17 is placed a side opposite to a support member 40 (the left side) of the cabin 15, and stores therein the urea water to be supplied to the second exhaust gas treatment unit 32. In this manner, the second exhaust gas treatment unit 32 is placed outside one of right and left sides of the hood 6, and the urea water tank 17 is placed outside another of right and left sides of the hood 6. This arrangement provides a better mass balance of the body 2, and also provides an effective space utility.

As illustrated in FIG. 3, the fuel tank 16 extends across the right and left sides of the body 2. For example, a hydraulic hose 50 for supplying hydraulic pressure toward a front loader is passed through a joystick valve 51 provided on a side surface of the fuel tank 16, and is routed from the transmission case 8 to a lower part of the fuel tank 16. Due to this, the hydraulic hose 50 is easily routed. In addition, the lower surface of the fuel tank 16 is provided with a hose insertion part having an outer shape with a notch-like recess. Inserting the hydraulic hose 50 in the hose insertion part can reduce the amount of projection of the hydraulic hose 50 from the lower surface of the fuel tank 16. Due to this, the hydraulic hose 50 is easily routed.

Figure 4:
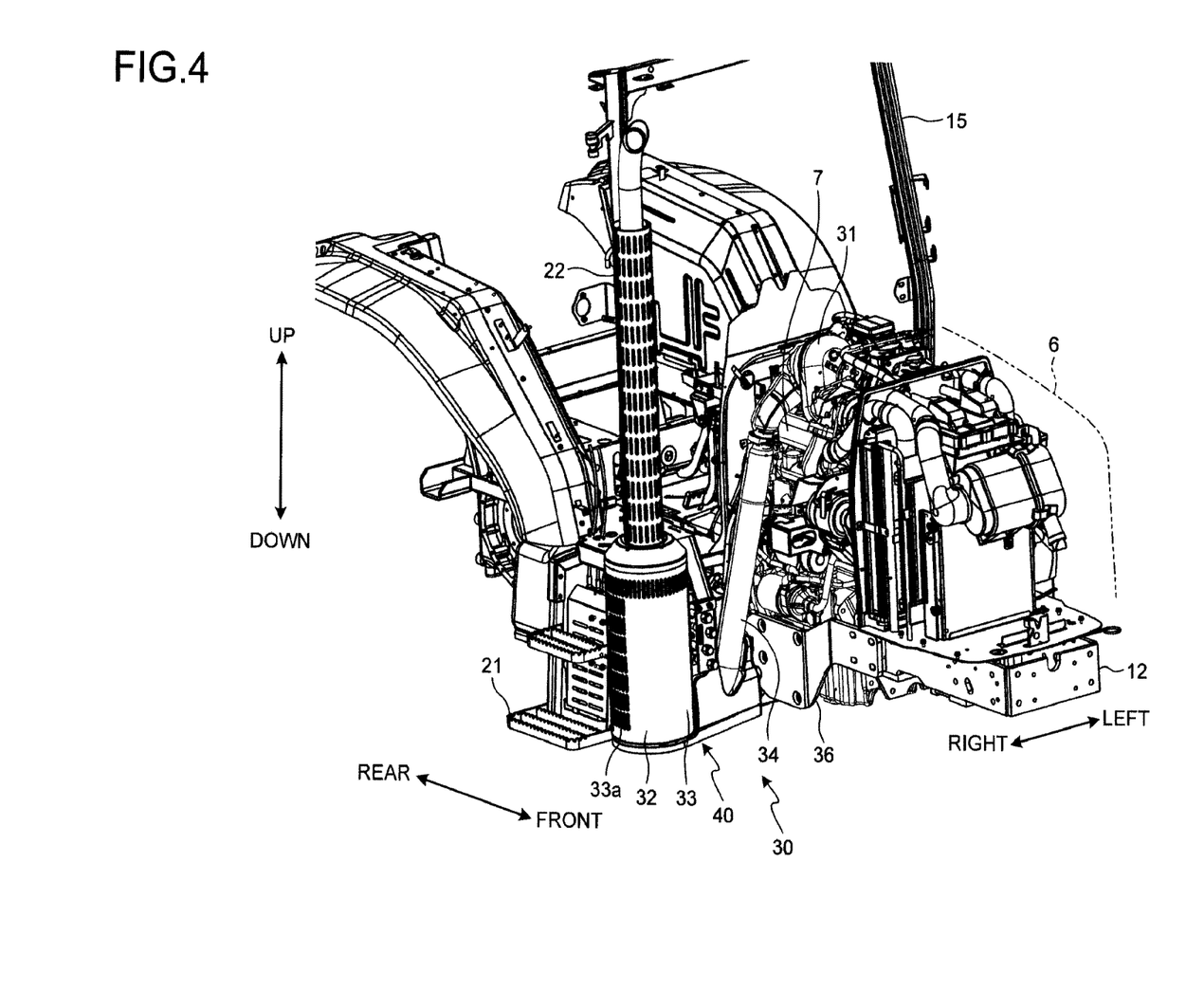
FIG. 4 is a perspective view illustrating an exhaust gas treatment mechanism.
Figure 5:
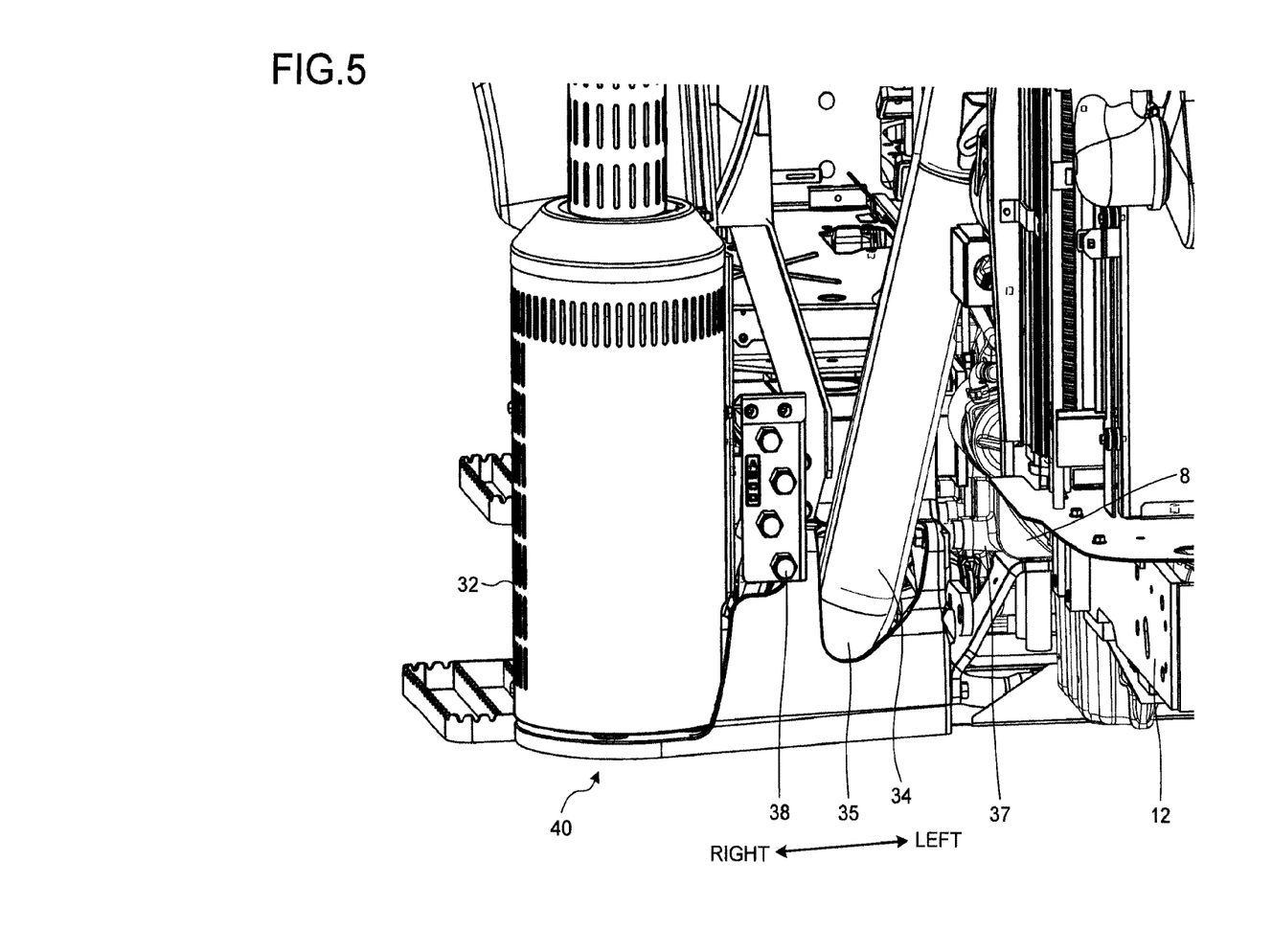
FIG. 5 is a perspective view illustrating a second exhaust gas treatment unit and a support member.

The following describes the configuration of the exhaust gas treatment mechanism 30 with reference to the FIGS. 4 and 5. FIG. 4 is a perspective view illustrating the exhaust gas treatment mechanism 30. FIG. 5 is a perspective view illustrating the second exhaust gas treatment unit 32 and the support member 40. As described above, the exhaust gas treatment mechanism 30 includes the first exhaust gas treatment unit 31 (DOC) and the second exhaust gas treatment unit 32 (SCR). As illustrated in FIG. 4, the first exhaust gas treatment unit 31 is mounted on top of the engine 7. The exhaust gas from the engine 7 flows into the first exhaust gas treatment unit 31. As described above, the first exhaust gas treatment unit 31 converts the nitrogen monoxide (NO) contained in the exhaust gas into the nitrogen dioxide ($NO_2$). The second exhaust gas treatment unit 32 is formed in a circular cylindrical shape, and is mounted in an upright state by being supported by the support member 40 (to be described later) outside the right or left side of the hood 6 (right side of the hood 6, in the present embodiment). The exhaust gas after being subjected to the primary treatment in the first exhaust gas treatment unit 31 flows into the second exhaust gas treatment unit 32. As described above, the second exhaust gas treatment unit 32 supplies the urea water (NH$_3$) to the nitrogen dioxide (NO$_2$) so as to convert the nitrogen dioxide (NO$_2$) into the water (H$_2$O) and the nitrogen gas (N$_2$). This process removes the nitrogen oxides (NO$_x$) in the exhaust gas. The exhaust gas after being subjected to the secondary treatment in the second exhaust gas treatment unit 32 is discharged from the muffler 22 to the atmosphere.

A heat shielding plate 33 covers the outer circumference of the second exhaust gas treatment unit 32. Covering the outer circumference with the heat shielding plate 33 in this manner can increase the heat-insulating effect on the second exhaust gas treatment unit 32. A pipe (tail pipe) 34 connects the first exhaust gas treatment unit 31 to the second exhaust gas treatment unit 32. A front loader bracket 36 (hereinafter, simply called a "loader bracket") for mounting thereon the front loader is provided between the body frame 12 for placing thereon the engine 7 and the support member 40 for placing thereon the second exhaust gas treatment unit 32. The body frame 12 is connected to the support member 40 using the loader bracket 36. In this manner, using the existing component for connecting the body frame 12 to the support member 40 can reduce the cost for production.

An adapter 38 for taking out the hydraulic pressure for the front loader is provided at a place between the second exhaust gas treatment unit 32 and the engine 7 on the support member 40. In this manner, providing a device (such as the pressure takeout device) used for another device (such as the front loader) on the support member 40 can also reduce the production cost by virtue of the structure. This structure also provides an effective space utility.

The body frame 12 and the support member 40 are temporarily connected together by a collar member 37 (refer to FIG. 5) before being connected together by the loader bracket 36. In this case, as illustrated in FIG. 5, the support member 40 is mounted on the collar member 37 that is provided so as to project rightward or leftward from the transmission case 8, and with the support member 40 mounted, the loader bracket 36 is fixed to both the body frame 12 and the support member 40. Then, the collar member 37 is removed, and thus, the body frame 12 is completely connected to the support member 40 by the front loader bracket 36. The connection method described above enables the connection through a simple operation, and can thereby reduce the cost for production.

Figure 6:
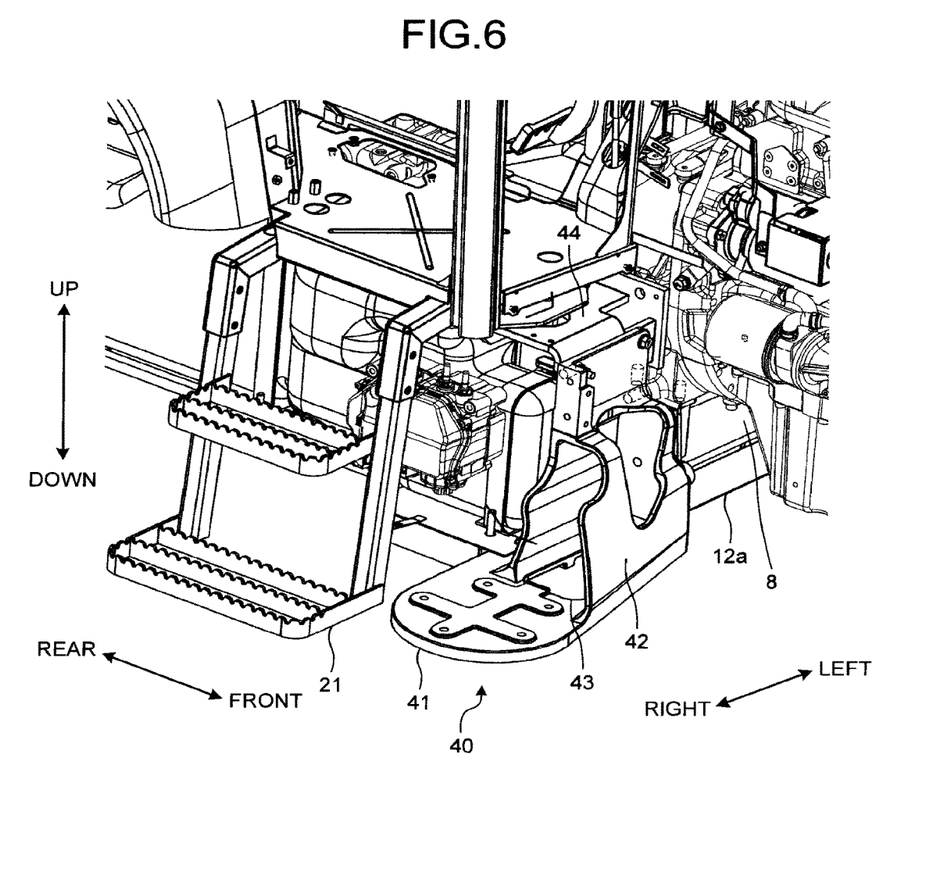
FIG. 6 is a perspective view illustrating the support member.

The second exhaust gas treatment unit 32 is supported by the support member 40, and hence, is placed outside the left side of the hood 6. The following describes the configuration of the support member 40 with reference to FIG. 6. FIG. 6 is a perspective view illustrating the support member 40. FIG. 6 illustrates a state in which the second exhaust gas treatment unit 32 and the pipe 34 are removed from the support member 40. As illustrated in FIG. 6, the support member (support bracket) 40 has a plate-like bottom 41 serving as a placement member on which the second exhaust gas treatment unit 32 is placed. The bottom 41 is formed in a plate shape that is longer in the right-left direction. The bottom 41 is placed so as to project forward from a portion of the body frame 12 for supporting the cabin 15 (hereinafter, this portion is referred to as a "body frame 12a"), and so that the second exhaust gas treatment unit 32 is placed in front of the boarding step unit 21 in a manner deviating from the center to either of the right and left sides (to the right side, in the present embodiment) of the bottom 41.

Specifically, the second exhaust gas treatment unit 32 is placed on the bottom 41 in a manner deviating from the center to the outside half of the bottom 41 as viewed from the hood 6 (to the right half of the bottom 41, in the present embodiment). A connection end 35 of the pipe 34 (refer to FIG. 5) connected to the second exhaust gas treatment unit 32 is placed on the bottom 41 in a manner deviating from the center to the inside half of the bottom 41 as viewed from the hood 6 (to the left half of the bottom 41, in the present embodiment). The support member 40 includes a cover 42 for covering the connection end 35 of the pipe 34 on the left half of support member 40 where the pipe 34 is placed. The cover 42 is provided with a hole having a diameter large enough to form a gap around the connection end 35 of the pipe 34 when the connection end 35 is placed on the bottom 41. This configuration prevents the pipe 34 from being exposed, and hence can enhance the appearance of the vehicle. An opening 43 is provided in a position of the bottom 41 where the connection end 35 of the pipe 34 is placed. The bottom 41 of the support member 40 is fixed to the body frame 12a, and the cover 42 of the support member 40 is fixed in a manner suspended from a lower part of the cabin 15 by an L-shaped fixing member (rubber mount) 44. Furthermore, the support member 40 is preferably integrally formed by casting. This can enhance the appearance. The support member 40 is integrally formed by casting, and in addition, the bottom 41 is flat. As a result, the second exhaust gas treatment unit 32 and the pipe 34 can be protected, and crops in the farm field can be prevented from being damaged.

With the above-described configuration of the tractor 1, the support member 40 supports the second exhaust gas treatment unit 32 from below, and hence, can support the second exhaust gas treatment unit 32 with an appropriate strength. This can improve the performance of supporting the second exhaust gas treatment unit 32. In addition, the simple structure allows the support member 40 to be made at a low cost. Furthermore, the second exhaust gas treatment unit 32 is placed in a separate manner from the body 2 to either of the right and left sides (to the right side), so that things below the cabin 15 on either of the right and left sides (on the right side) thereof can be easily viewed from the driver's seat 10, resulting in better visibility from the driver's seat 10.

The heat of the pipe 34 placed on the support member 40 is released out of the support member 40 through the opening 43, so that the support member 40 can be prevented from accumulating the heat. In addition, the support member 40 can be prevented from accumulating dust and the like.

The second exhaust gas treatment unit 32 is supported from below by the bottom 41 of the support member 40, and is also fixed at an upper part thereof by a fixing plate 45 extending from the bottom 41 (refer to FIG. 3). This structure can tightly hold the second exhaust gas treatment unit 32. To allow the fixing plate 45 to fix the upper part of the second exhaust gas treatment unit 32, a flange portion at the top surface of the heat shielding plate 33 (to be described later) extends upward.

As described above, the second exhaust gas treatment unit 32 is provided with the heat shielding plate 33 serving as a cover for covering the outer circumferential surface of the second exhaust gas treatment unit 32. The heat shielding plate 33 is provided with a plurality of vent holes 33a. The vent holes 33a are provided in a surface of the heat shielding plate 33 (surface on the rear side of the heat shielding plate 33) on a side opposite to a side thereof facing corresponding one of the front wheels (refer to FIG. 1) located in front of the second exhaust gas treatment unit 32. In other words, the vent holes 33a are preferably not provided in the surface on the front side of the heat shielding plate 33. The vent holes 33a only need to be provided outside a range of the heat shielding plate 33 facing the front wheel 4 when viewed therefrom. When, for example, the heat shielding plate 33 is placed in a manner deviating from the center to either of the right and left sides of the front wheel 4 when viewed therefrom, the range of the heat shielding plate 33 not provided with the vent holes 33a deviates to either of the right and left sides from a position in alignment with the front wheel 4. The vent holes 33a are preferably provided over a range of roughly the rear two thirds of the whole circumferential surface of the circular cylindrical heat shielding plate 33.

The above-described configuration of the tractor 1 can improve the heat-releasing performance of the second exhaust gas treatment unit 32 covered by the heat shielding plate 33. The configuration can also restrain mud and the like flying from the direction of the front wheel 4 (refer to FIG. 1) from coming in through the vent holes 33a provided in the heat shielding plate 33.

Figure 7:
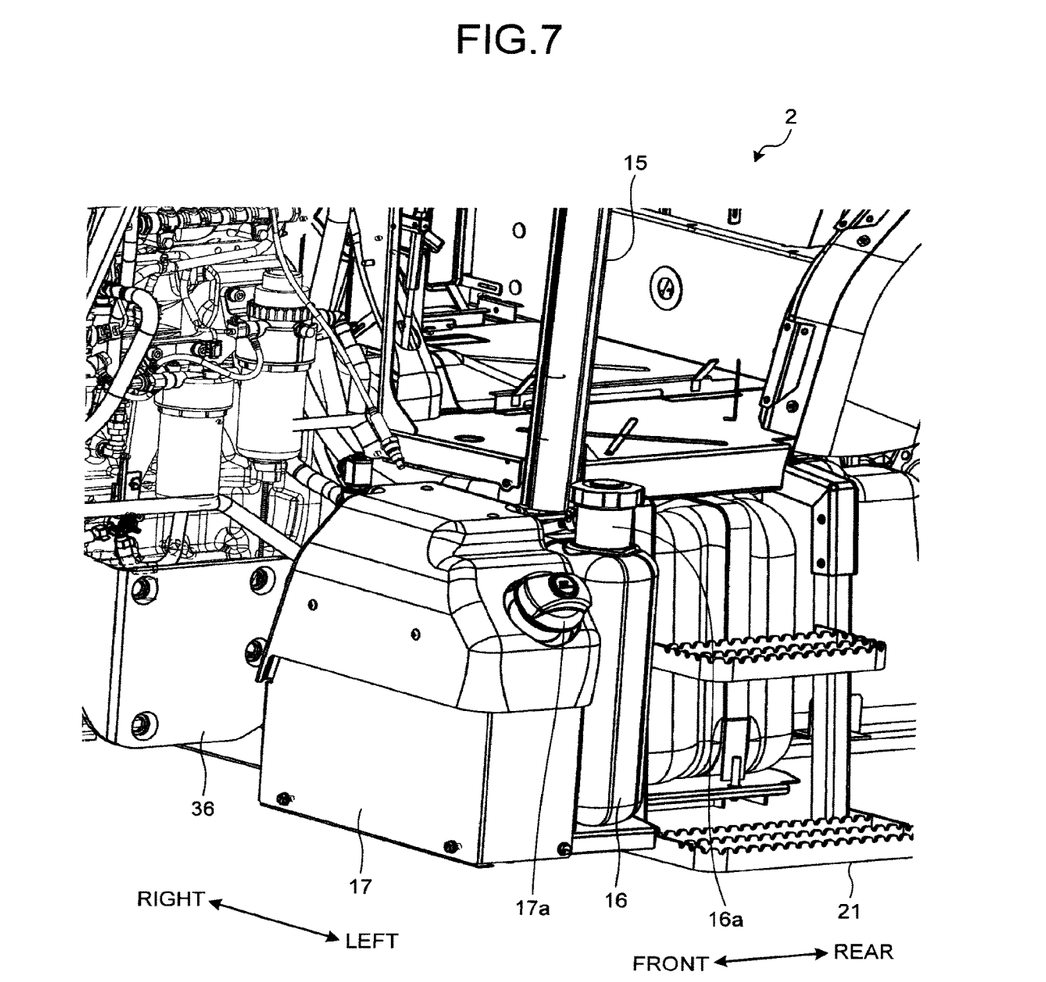
FIG. 7 is a perspective view illustrating a fuel tank and a urea water tank.
Figure 8:
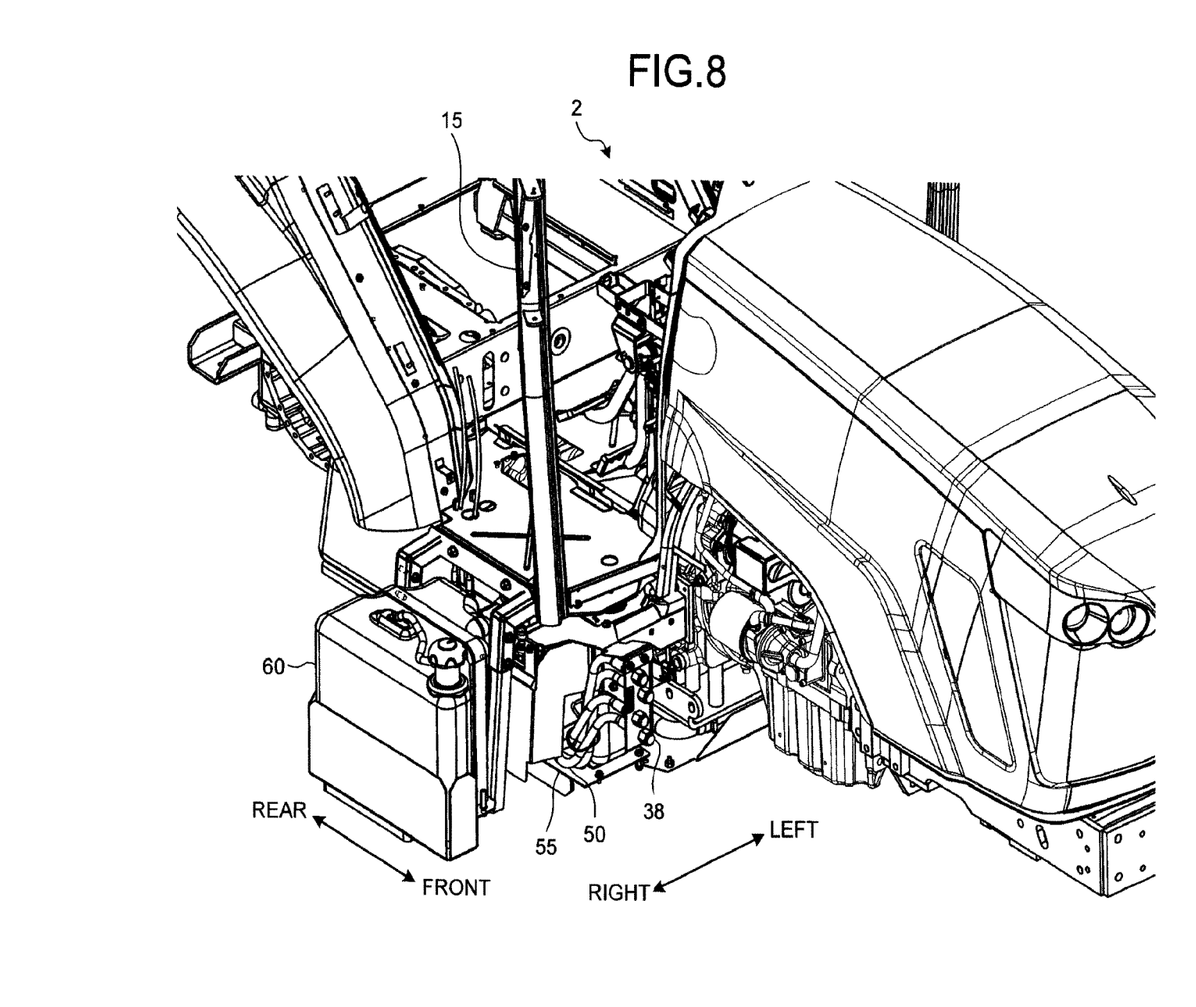
FIG. 8 is a perspective view illustrating a sub fuel tank.

The following describes the fuel tank 16 and the urea water tank 17 arranged on the body 2 with reference to FIGS. 7 and 8. FIG. 7 is a perspective view illustrating the fuel tank 16 and the urea water tank 17. FIG. 8 is a perspective view illustrating a sub fuel tank 60. As illustrated in FIG. 7, the urea water tank 17 is provided on a side opposite in the right-left direction to the side of the body 2 including the support member 40. The urea water tank 17 is fixed to the loader bracket 36 provided between the engine 7 and the urea water tank 17. This configuration can place the urea water tank 17 with the simple structure, and thus can reduce the cost for production. The fuel tank 16 is provided on the left side of the body 2 so as to be arranged side by side in the front-rear direction with the urea water tank 17. A feed port 17a of the urea water tank 17 and a feed port 16a of the fuel tank 16 are provided side by side in the front-rear direction. The fuel tank 16 is provided below the body 2 (cabin 15) so as to extend in the right-left direction. The urea water tank 17 is arranged in front of the fuel tank 16 outside the right or left side (left side) of the cabin 15. As a result, the tractor of the type equipped with the urea water SCR system can be easily built.

As illustrated in FIG. 8, the sub fuel tank 60 is provided outside the right or left side (right side, in the present embodiment) of the body 2 (cabin 15), and supplies fuel to the engine 7 (refer to FIG. 3) through a line separate from the fuel tank 16. One of the boarding step units 21 (refer to FIG. 3) provided outside the right and left sides of the cabin 15 is removed to mount the sub fuel tank 60. In this case, the operator uses the boarding step unit 21 on the opposite side in the right-left direction of the cabin 15 to board into and unboard from the cabin 15. The sub fuel tank 60 may be connected to the fuel tank 16 so as to supply the fuel from the fuel tank 16 to the engine 7. In this case, the sub fuel tank 60 is preferably placed close to the fuel tank 16 below the cabin 15.

With the above-described configuration of the tractor 1, the sub fuel tank 60 is provided, so that the total amount of fuel can be increased, and thereby, workable time can be increased. The increase in the amount of fuel can be accomplished with the simple structure.

Placing the two fuel tanks (the fuel tank 16 and the sub fuel tank 60) at different heights may cause fuel leakage, so that quality against the fuel leakage is not easily ensured. Therefore, the sub fuel tank 60 is preferably placed at the same height as that of the fuel tank 16. This arrangement makes it easy to ensure the quality against the fuel leakage.

Placing the fuel tanks 16 and 60 at the same height also makes it easy to manage the remaining quantity of the fuel.

The sub fuel tank 60 is preferably connected to the fuel tank 16 through two or more hoses. This configuration can ensure flowability of the fuel between the sub fuel tank 60 and the fuel tank 16. Check valves may be provided in the hoses connecting the sub fuel tank 60 to the fuel tank 16. This configuration can prevent the fuel from flowing back from the fuel tank 16, between the sub fuel tank 60 and the fuel tank 16.

In the present embodiment, the adapter 38 described above is provided in front of the cabin 15, as a takeout port of the hydraulic pressure used for the front loader. In the present embodiment, a support bracket 55 for the fuel tank 16 provided below the cabin 15 (refer to FIG. 2) is used also as a cover of the hydraulic hose 50. Theses configurations allow the hydraulic hose 50 to be easily routed to the front loader.

Figure 9:
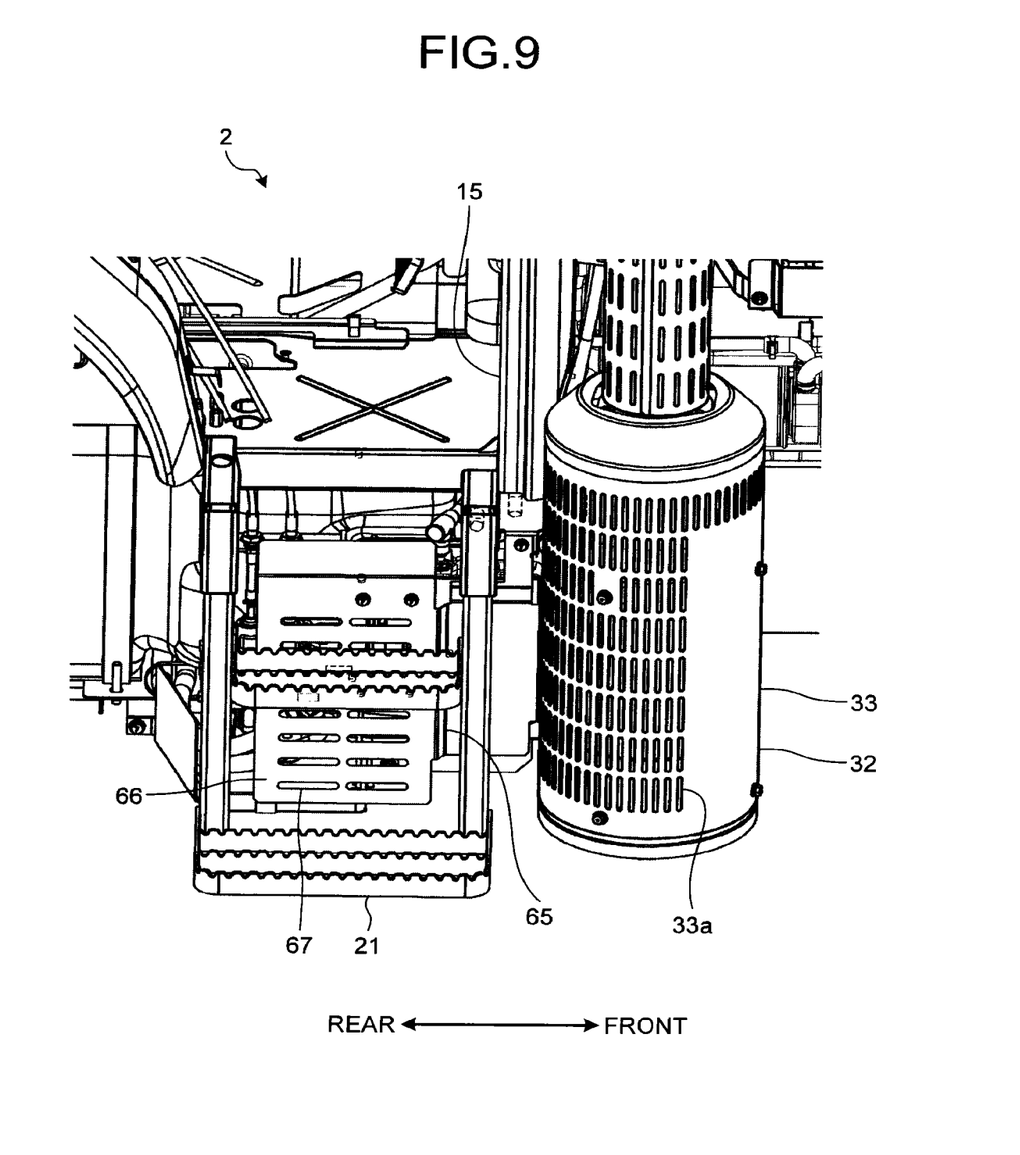
FIG. 9 is a perspective view illustrating a urea water pump.

The following describes a urea water pump 65 for supplying urea water from the urea water tank 17 to the second exhaust gas treatment unit 32 with reference to FIG. 9. FIG. 9 is a perspective view illustrating the urea water pump 65. As illustrated in FIG. 9, the urea water pump (supply pump) 65 is provided on the inner side of the boarding step unit 21 below the cabin 15, and is also provided close to the second exhaust gas treatment unit 32. This arrangement provides an effective space utility. The arrangement also prevents the body 2 from increasing in size, and can thereby reduce the cost for production.

A plate-like pump cover (supply cover) 66 is attached to the urea water pump 65. The pump cover 66 is made of, for example, metal, and is bent to be formed to have L-shapes so as to cover at least externally exposed front and upper surfaces of the urea water pump 65. This shape can prevent mud and the like from adhering to the urea water pump 65, and being made of metal can enhance the effect of cooling the urea water pump 65. In addition, hiding the urea water pump 65 with the pump cover 66 can enhance the appearance of the vehicle. The pump cover 66 is formed so as to cover, for example, the hydraulic hose 50 and the joystick valve 51, in addition to the urea water pump 65. In the following description, components, such as the urea water pump 65, the hydraulic hose 50, and the joystick valve 51, related to various types of supply are collectively called "supply modules" in some cases.

A plurality of slit-like vent holes 67 are provided in the pump cover 66 for the urea water pump 65. This configuration can release the heat of the urea water pump 65 outward, and thus can enhance the effect of cooling the urea water pump 65. The configuration also provides good visual quality from the viewpoint of design, and hence can enhance the appearance of the vehicle.

The above embodiment can achieve the following the tractor 1.

(1) The tractor 1 further includes the support member 40 that supports the exhaust gas treatment unit 32, the placement member 41 of the support member 40 to place thereon the exhaust gas treatment unit 32, and the heat-releasing opening 43 in the placement member 41.

In the tractor 1 in (1), The support member 40 supporting the exhaust gas treatment unit 32 is prevented from accumulating heat.

(2) The exhaust gas treatment unit 32 of the tractor 1 purifies the exhaust gas with urea water supplied by the urea water pump 65; the urea water pump 65 is provided behind the exhaust gas treatment unit 32; the pump cover 66 is provided to cover a lateral outside of the urea water pump 65; and the vent hole 67 is formed in the pump cover 66.

In the tractor 1 in (2), The vent hole 67 or holes formed in the pump cover 66 can release the heat of the urea water pump 65 outward. In other words, the urea water pump 65 can be cooled more effectively.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A tractor comprising:
   a front wheel and a rear wheel;
   an engine;
   a hood that covers the engine;
   an exhaust gas treatment unit that purifies exhaust gas from the engine, the exhaust gas treatment unit being placed laterally outside right or left side of the hood and behind the front wheel, the exhaust gas treatment unit including an outer circumferential surface;
   a circular cylindrical heat shielding plate that covers the outer circumferential surface of the exhaust gas treatment unit, the heat shielding plate including a front surface and a rear surface;
   a plurality of vent holes that are formed in the rear surface of the heat shielding plate and are not formed in a region that lies on the front surface of the heat shielding plate and faces the front wheel;
   a support member that supports the exhaust gas treatment unit, the support member including a placement member that places thereon the exhaust gas treatment unit; and
   a heat-releasing opening in the placement member.

2. A tractor comprising:
   a front wheel and a rear wheel;
   an engine;
   a hood that covers the engine;
   an exhaust gas treatment unit that purifies exhaust gas from the engine, the exhaust gas treatment unit being placed laterally outside right or left side of the hood and behind the front wheel, the exhaust gas treatment unit including an outer circumferential surface;
   a circular cylindrical heat shielding plate that covers the outer circumferential surface of the exhaust gas treatment unit, the heat shielding plate including a front surface and a rear surface;
   a plurality of vent holes that are formed in the rear surface of the heat shielding plate and are not formed in a region that lies on the front surface of the heat shielding plate and faces the front wheel;
   a urea water pump that supplies urea water to the exhaust gas treatment unit, the exhaust gas being purified with the urea water, the urea water pump being provided behind the exhaust gas treatment unit;
   a pump cover that covers a lateral outside of the urea water pump, the pump cover being different from the heat shielding plate; and
   a vent hole that is formed in the pump cover.

3. The tractor according to claim 1, further comprising;
   a urea water pump that supplies urea water to the exhaust gas treatment unit, the exhaust gas being purified with the urea water, the urea water pump being provided behind the exhaust gas treatment unit;
   a pump cover that covers a lateral outside of the urea water pump; and
   a vent hole that is formed in the pump cover.

* * * * *